(12) United States Patent
Feller (10) Patent No.: US 11,573,332 B2
(45) Date of Patent: Feb. 7, 2023

(54) WIDEBAND GNSS ANTENNA SYSTEM

(71) Applicant: Hemisphere GNSS Inc., Scottsdale, AZ (US)

(72) Inventor: Walter Feller, Okanagan Falls (CA)

(73) Assignee: Hemisphere GNSS, Inc., Scottsdale, AZ (US)

( * ) Notice: Subject to any disclaimer, the term of this patent is extended or adjusted under 35 U.S.C. 154(b) by 1006 days.

(21) Appl. No.: 16/288,921

(22) Filed: Feb. 28, 2019

(65) Prior Publication Data

US 2020/0278454 A1    Sep. 3, 2020

(51) Int. Cl.
  *G01S 19/36* (2010.01)
  *H01Q 9/44* (2006.01)
  *H01Q 7/00* (2006.01)
  *H01Q 21/30* (2006.01)

(52) U.S. Cl.
  CPC .............. *G01S 19/36* (2013.01); *H01Q 7/00* (2013.01); *H01Q 9/44* (2013.01); *H01Q 21/30* (2013.01)

(58) Field of Classification Search
  CPC . G01S 19/36; H01Q 7/00; H01Q 9/44; H01Q 21/30
  See application file for complete search history.

(56) References Cited

U.S. PATENT DOCUMENTS

| | | | |
|---|---|---|---|
| 5,198,826 | A | 3/1993 | Ito |
| 2002/0113748 | A1 | 8/2002 | Andrews et al. |
| 2010/0117914 | A1 | 5/2010 | Feller et al. |
| 2013/0201065 | A1 | 8/2013 | Parsche |

FOREIGN PATENT DOCUMENTS

CN    108631055 A  * 10/2018  .............. H01Q 1/38

OTHER PUBLICATIONS

Feller, Walter, Wideband GNSS Antenna System, Patent Cooperation Treaty Application Serial No. PCT/US20/19471, filed Feb. 24, 2020, International Search Report and Written Opinion dated May 20, 2020.

* cited by examiner

*Primary Examiner* — Timothy A Brainard
*Assistant Examiner* — Helena H Seraydaryan
(74) *Attorney, Agent, or Firm* — Schmeiser, Olsen & Watts LLP (57) ABSTRACT

A complex and intricate GNSS antenna that is created using inexpensive manufacturing techniques is disclosed. The antenna combines a loop antenna and a cross dipole antenna together, in a single plane, to create an optimal GNSS gain pattern. The antenna structure is symmetric and right-hand circular polarized to force correct polarization over a wide range of frequency and beamwidth. The feed structure is part of the antenna radiating element.

14 Claims, 10 Drawing Sheets

WIDEBAND GNSS ANTENNA SYSTEM

BACKGROUND OF THE INVENTION

Technical Field

This invention relates generally to Global Navigation Satellite System receiver antennas, and particularly to a high-end Global Navigation Satellite System receiver antennas providing multipath reduction while still receiving all visible satellite signals above the horizon, while allowing for inexpensive manufacturing techniques and materials.

State of the Art

High-end Global Navigation Satellite System (GNSS) receivers are typically capable of receiving signals from a plurality of GNSS satellites available, including European, Russian, Chinese, Japanese, and American GNSS satellites. These satellites transmit at slightly different frequencies, so an antenna must receive from 1555 to 1610 MHz for just the 1.5 GHz band, for example. In addition, there are many GNSS high-end users which, in order to have access to and utilize correction services, typically utilize INMARSAT geostationary satellites. This widens the relevant frequency range for the 1.5 GHz band to include the range from 1530 to 1560 MHz. Because the link margin is very tight in these scenarios, low elevation gain and high antenna efficiencies are needed. GNSS satellites and INMARSAT satellites transmit right hand circular polarization (RHCP) signals. Reflections from perfect reflectors become left hand circular polarized (LHCP) and usually arrive from below the horizon. In order to compute a precise position using GNSS signals, it is important to reject multipath as much as possible. This is accomplished by maximizing the LHCP rejection, minimizing the gain below the horizon and providing as wide a beamwidth for RHCP signals above the horizon as possible. These requirements make design of a high-end GNSS antenna complicated, typically requiring the use of expensive RF materials.

Accordingly, what is needed is a high-end GNSS antenna providing for multipath reduction while receiving all visible satellite signals above the horizon, and that uses inexpensive manufacturing techniques and materials.

SUMMARY OF THE INVENTION

The present invention relates generally to Global Navigation Satellite System receiver antennas, and particularly, to a high-end Global Navigation Satellite System receiver antenna providing for multipath reduction while still receiving all visible satellite signals above the horizon, and that uses inexpensive manufacturing techniques and materials.

The disclosed structure antenna system provides an ideal gain pattern for GNSS receivers. The antenna system uses a parasitic loop fed by a cross dipole antenna, in a single plane. The dipole antenna is also part of the radiating element. Using a feed network as part of the radiating structure increases efficiency. The loop provides low elevation gain which the cross dipole cannot. The antenna structure is separated from a low-noise amplifier (LNA) PCB acting as a ground plane, with spacers and an air gap between the antenna elements and ground plane, such that the air gap is used as a dielectric between the antenna element and the ground plane. The air dielectric, having no ceramic or plastic, provides for low losses (higher efficiency) and low cost, but typically creates an issue with the edges being 180 degrees apart, causing very poor gain at the horizon. However, by not using a dielectric other than air, the useful bandwidth is increased. To compensate for the low elevation gain, the feed (cross dipole) is meandered, or spiraled, such that it has resonant ¼ wavelength-long arms that fit within the loop. The loop, being approximately 1 wavelength in circumference (required for resonance), has a radius of wavelength/$2\pi$, or approximately ⅙ of a wavelength. This provides low elevation gain required for INMARSAT tracking. The gain pattern may be adjusted by coupling tuning capacitors to the loop.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in conjunction with the Figures, wherein like reference numbers refer to similar items throughout the Figures, and:

DETAILED DESCRIPTION OF EMBODIMENTS OF THE INVENTION

Figure 1:
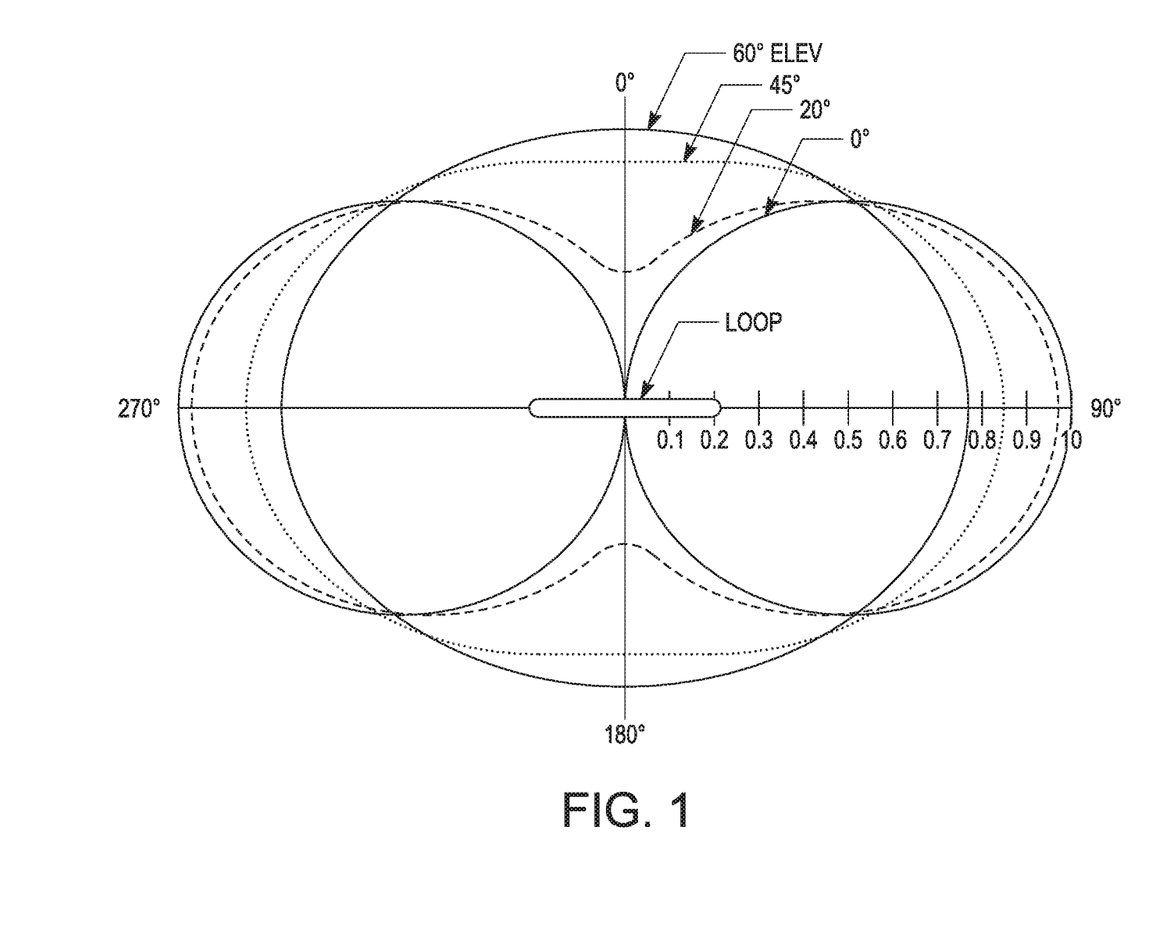
FIG. 1 is a diagrammatic view of the gain pattern of a conventional loop antenna having no ground plane.

Referring to the drawings, FIG. 1 is a side view of a conventional loop antenna without a ground plane, having gain patterns associated with the antenna superimposed over the antenna. This generally illustrates the expected gain at various locations relative to the antenna. As shown, the highest gain of the loop antenna is in line with the plane of the loop (270 degrees and 90 degrees). As shown, the lowest gain of the loop antenna occurs at approximately 0 degrees and 180 degrees.

Figure 2:
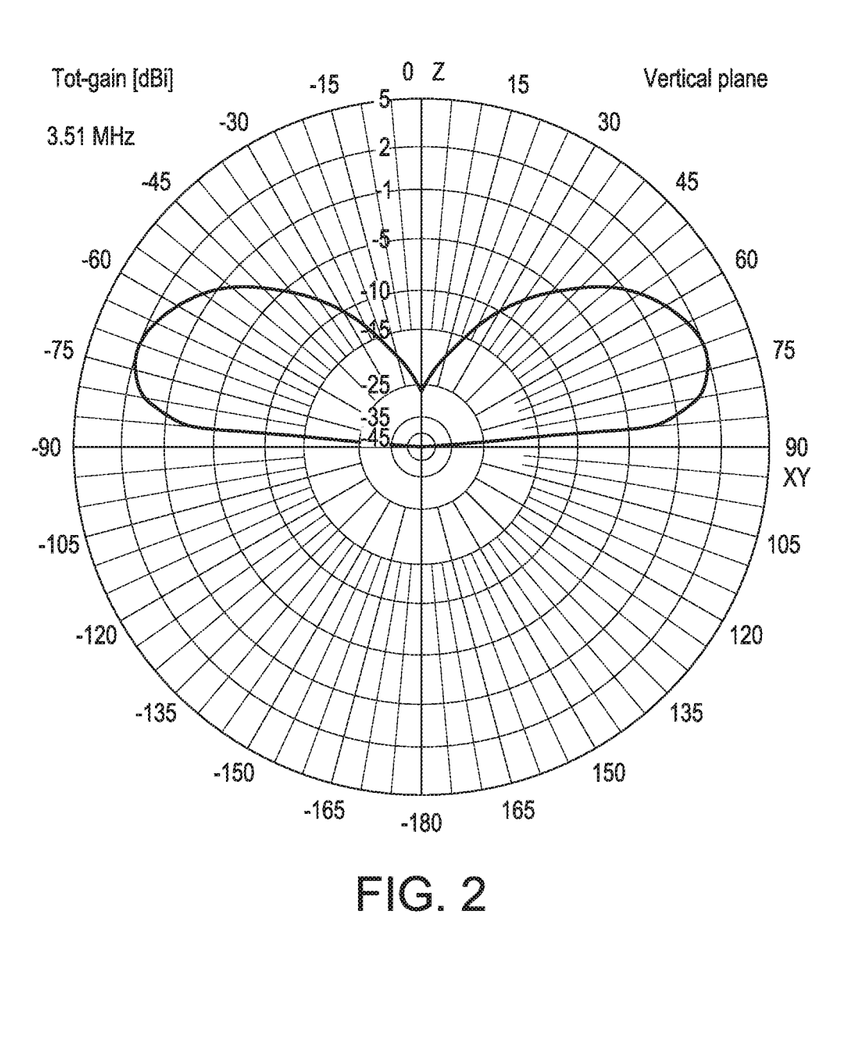
FIG. 2 is a diagrammatic view of the gain pattern of a conventional loop antenna positioned over a ground plane.

FIG. 2 shows the gain pattern of a conventional loop antenna with a ground plane. As shown in FIG. 2, the line passing through −90 degrees, the origin, and +90 degrees is referred to as the "horizon." As shown, the loop antenna over a ground plane has null (0) gain directly over the horizon (from approximately −90 degrees to −85 degrees, and from approximately +85 degrees to +90 degrees), but is still optimized (providing high gain) at low angles (approximately −75 degrees to −45 degrees, and +45 degrees to +75 degrees) over the plane of the loop.

Figure 3:
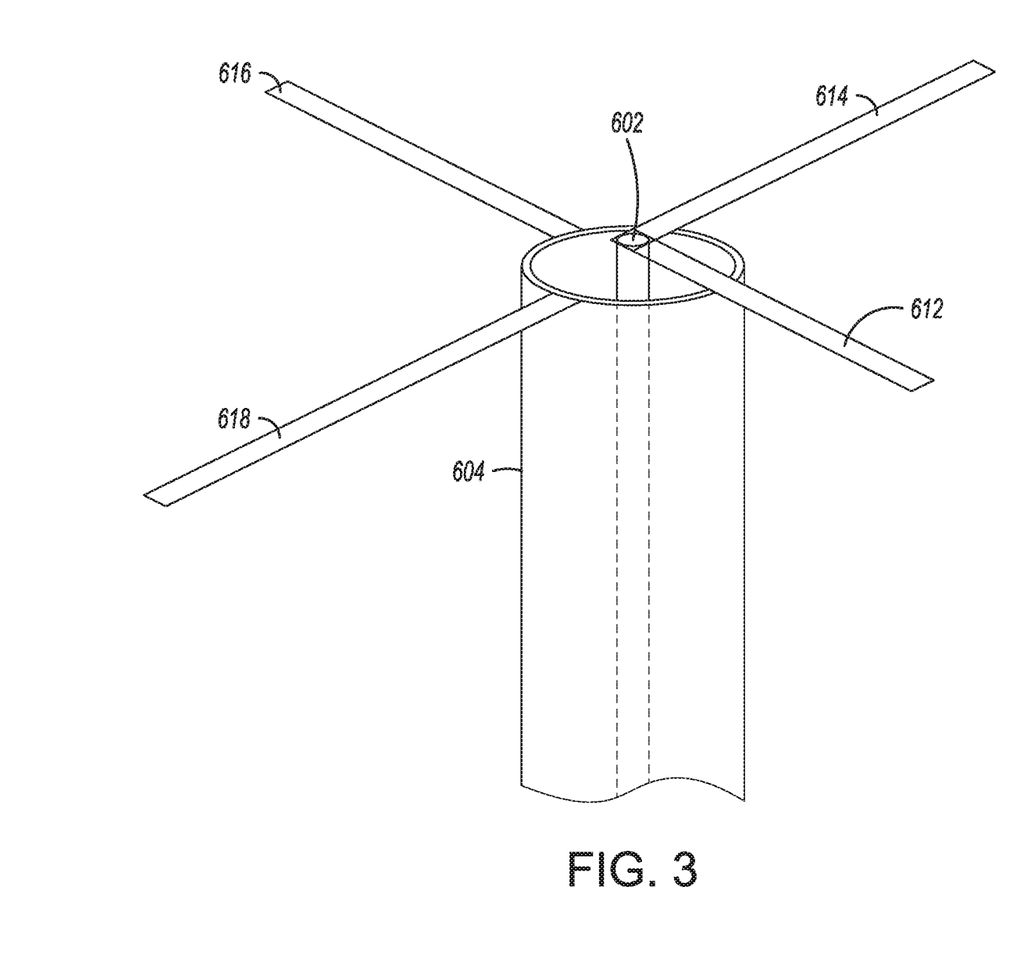
FIG. 3 is a perspective view of a crossed dipole antenna.

FIG. 3 is a perspective view of a crossed dipole antenna having two dipoles. The first dipole is formed by arms 614 and 618, and the second dipole is formed by arms 616 and 612. As shown, the second dipole may be rotated about an axis passing through the center of rod 602.

Figure 4:
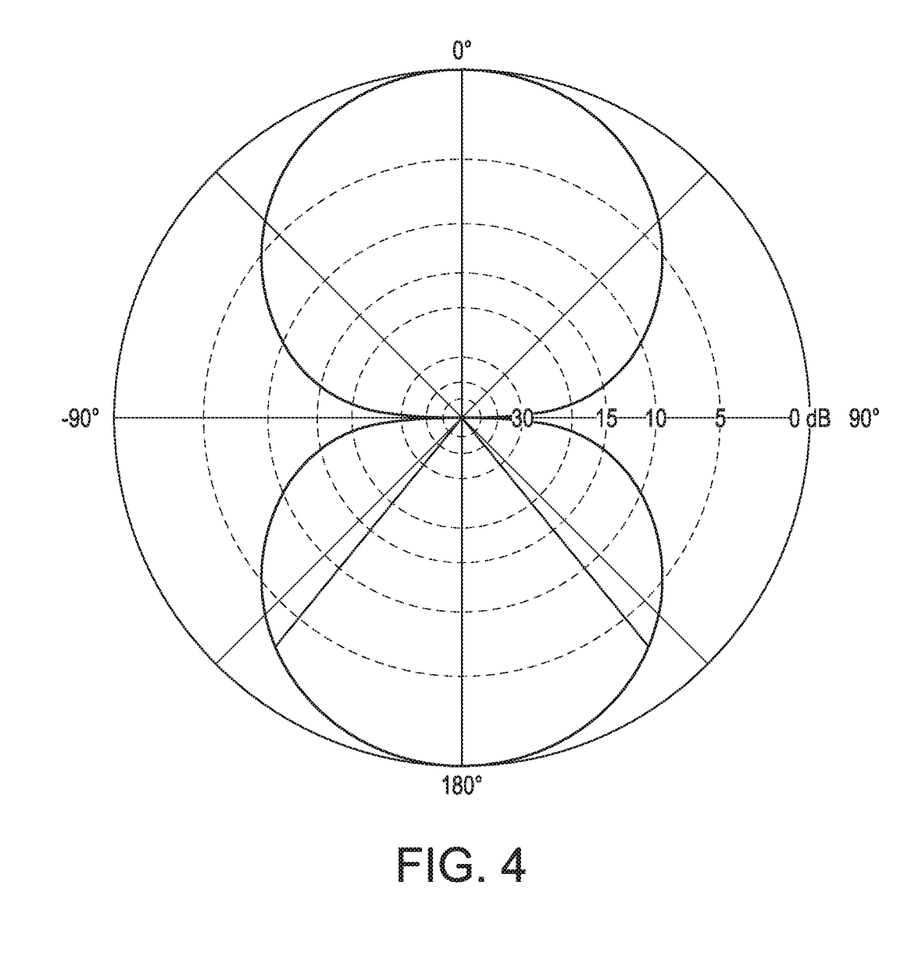
FIG. 4 is a diagrammatic view of the gain pattern of a conventional crossed dipole antenna with no ground plane.

FIG. 4 shows the gain pattern of a cross dipole with no ground plane. In the figure, the line passing through −90 (or 270 degrees) degrees, the origin, and +90 degrees is referred to as the horizon. As shown, the gain for the conventional cross dipole antenna at 45 degrees above or below the horizon drops quickly and is below −10 dB at angles below 60 degrees from the horizon (and is approximately 0 at 90 degrees above the horizon).

Figure 5:
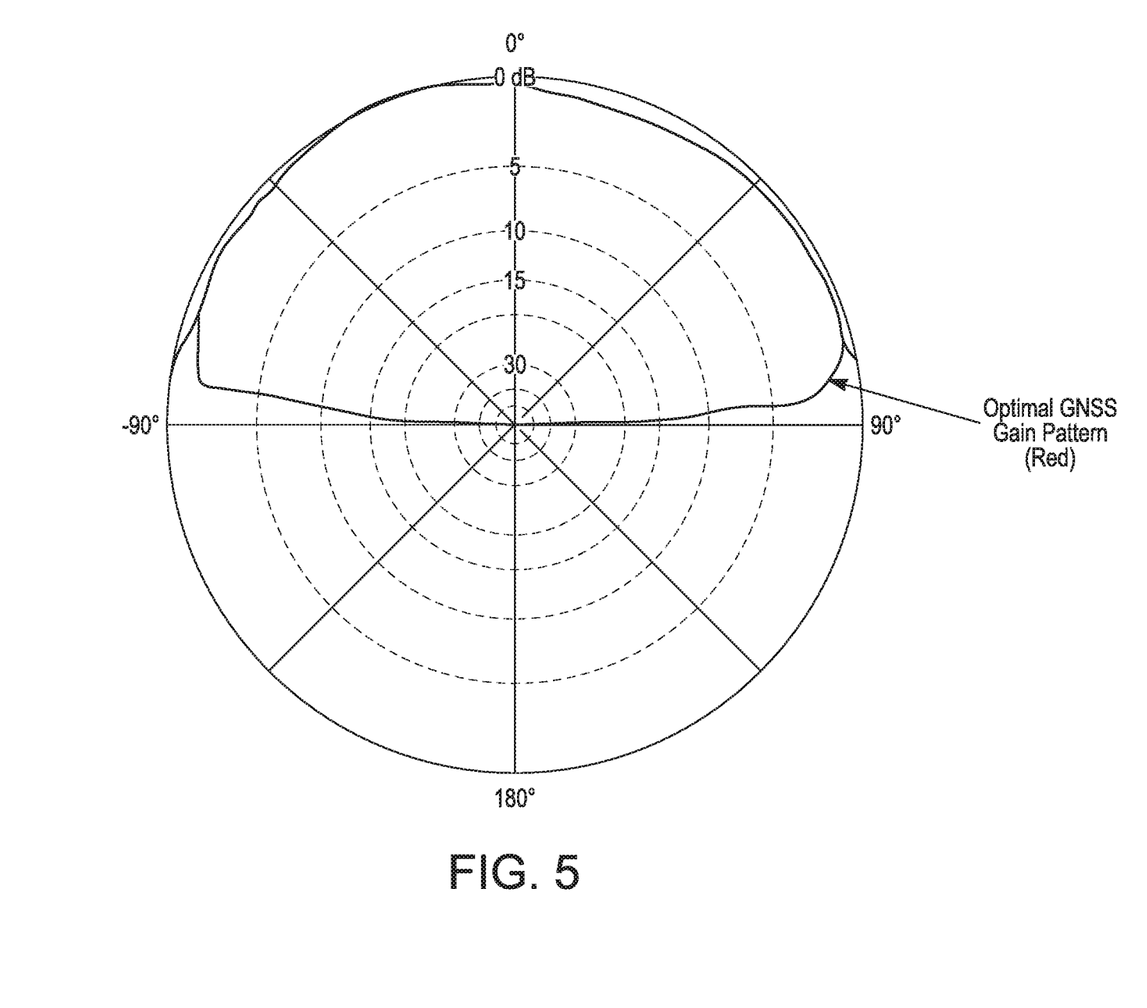
FIG. 5 is a diagrammatic view of an optimal desired GNSS receiver antenna gain pattern.

FIG. 5 shows an approximate optimized desired gain pattern for a GNSS antenna, which is substantially in the shape of a hemisphere above ground level. In accordance with the present invention, use of a crossed dipole antenna with a ground plane combined with a loop antenna, with correct weighting, results in an optimized desired gain pattern approximating that shown in FIG. 5.

Figure 6:
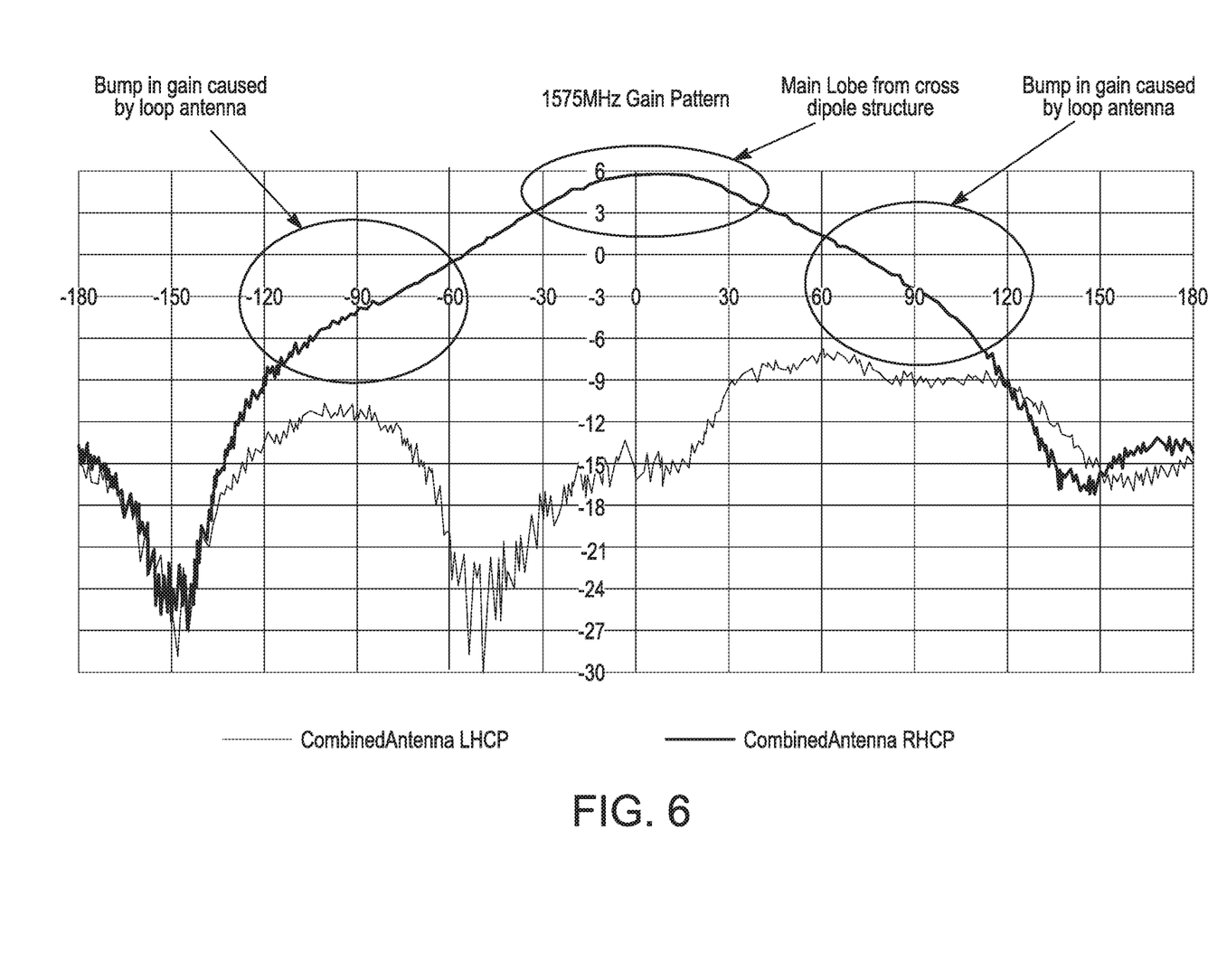
FIG. 6 is a diagrammatic view of a gain pattern of a GNSS antenna system in accordance with an embodiment of the present invention.

FIG. 6 shows the actual measured gain pattern of a GNSS antenna system 50 in accordance with an embodiment of the present invention. The gain pattern shows an increase in low elevation gain (near the horizon) when compared to conventional antennas.

Figure 7:
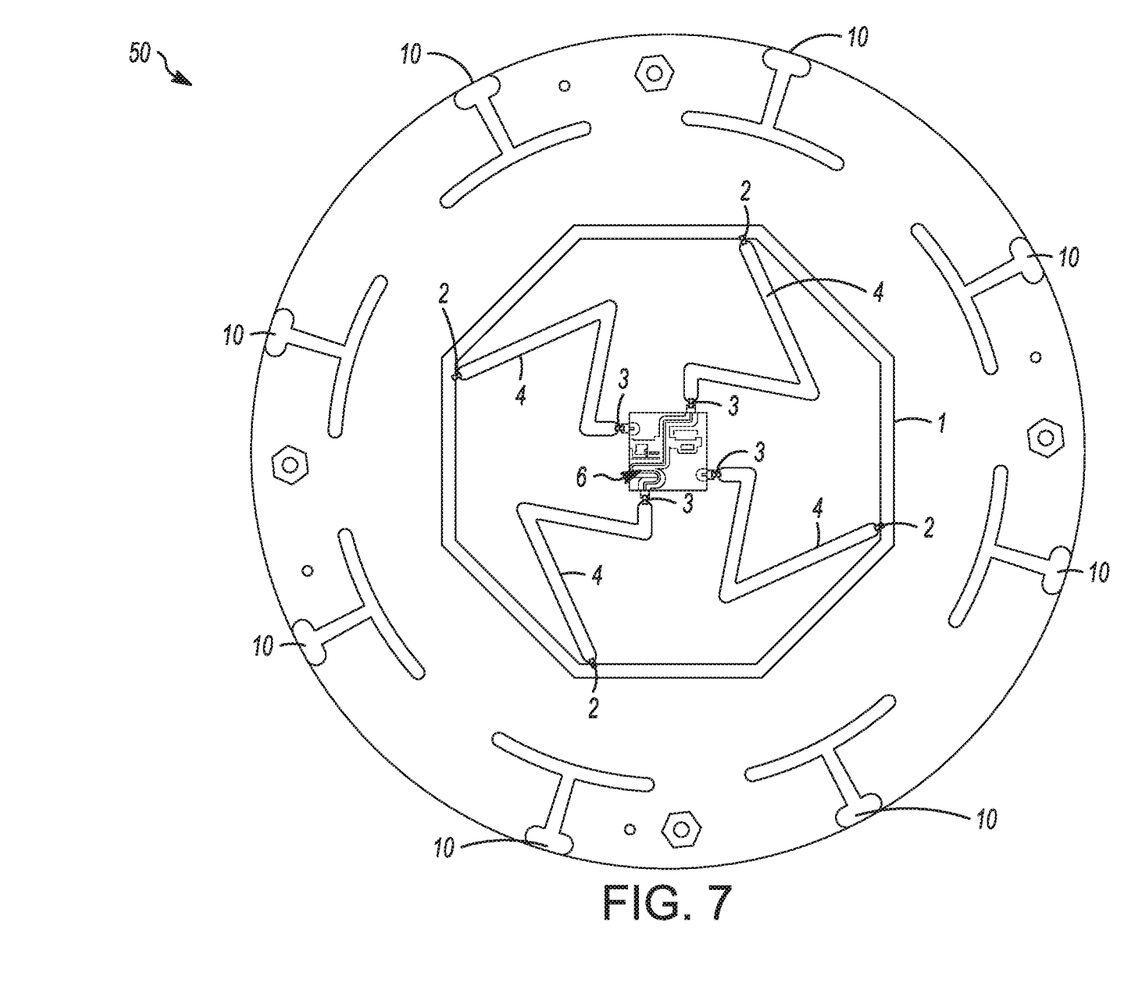
FIG. 7 generally illustrates a top view of a GNSS antenna system in accordance with an embodiment of the present invention.

FIG. 7 generally illustrates a top view of a GNSS antenna system 50 in accordance with an embodiment of the present invention. As shown in FIG. 7, a parasitic conducting loop 1 is provided formed on the surface of an upper printed circuit board (PCB) 16. In the embodiment of FIG. 7, the upper printed circuit board has a diameter of 107 mm. The loop 1 has a length (circumference) of 1 wavelength, providing radius of 1 wavelength/2π (approximately ⅙ of a wavelength). This provides for low-elevation gain that may be needed, for example, for INMARSAT tracking. Four conducting cross-dipole arms 4 are provided formed on the surface of the upper PCB 16. Each conducting cross-dipole arm 4 has the same shape, and is formed such that its first end is located near the center of the loop 1, and radiates (meanders) outward from the center outward toward the conducting loop 1. In alternative embodiments, the cross-dipole arms may have different shapes than shown. The second end of each conducting cross-dipole arm 4 terminates adjacent to the loop 1. In the embodiment of FIG. 7, the first ends of the cross-dipole arms 4 are spaced approximately equidistant from the center, and the cross-dipole arms 4 are located symmetrically about the center such that corresponding points on the cross-dipole arms 4 are equidistant from each other about the center of the loop 1. The cross-dipole arms 4 are further configured such that they do not overlap each other. The length of each cross-dipole arm 4 is configured to be ¼ of the length of the loop 1 (i.e. ¼ wavelength). The second end of each cross-dipole arm is coupled at its end to the loop 1 via a coupling/matching capacitor 2 (one coupling capacitor for each cross-dipole arm 4). In the embodiment of FIG. 7, each cross-dipole arm 4 is coupled through matching components 3 to a phase network which creates 0-, 90-, 180- and 270-degree phase signals at roughly equal amplitudes. In the embodiment of FIG. 7, matching components 3 are series RF capacitors of 1.8 pF in value. In the embodiment of FIG. 7, upper PCB 16 is comprised of FR4, an inexpensive standard PCB material which allows the antenna system to be manufactured to meet these requirements with precision.

Figure 8:
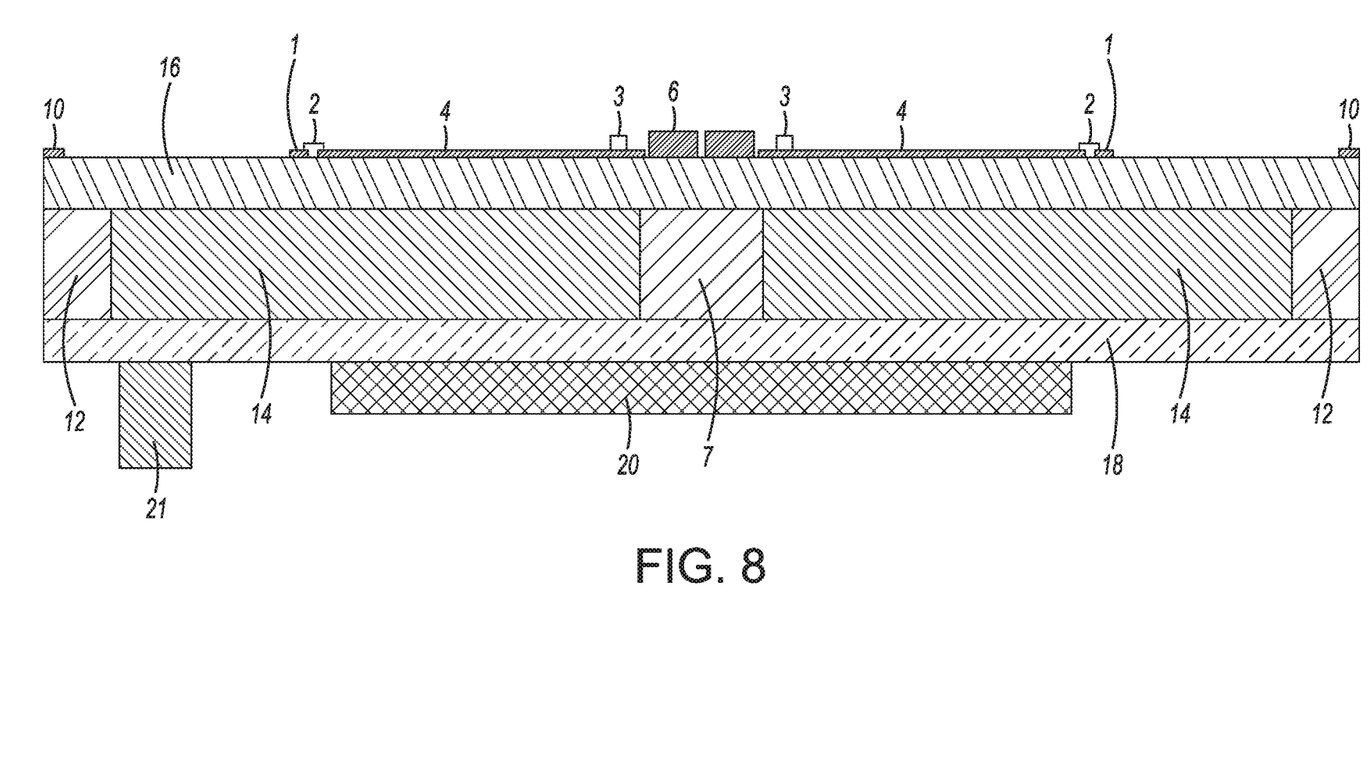
FIG. 8 is a cross-section of a GNSS antenna system in accordance with an embodiment of the present invention.

FIG. 8 is a cross-section view of the embodiment of FIG. 7. Referring to both FIGS. 7 and 8, the antenna system 50 further includes a second, lower PCB 18 acting as a ground plane. In the embodiment of FIGS. 7 and 8, lower PCB 18 has a diameter of 107 mm, and includes a low-noise amplifier (LNA) 20. In the embodiment of FIGS. 7 and 8, the planar antenna structure formed on the upper PCB 16 is separated from lower PCB 18 by a wrap-around flex PCB ring 12 (shown in cross-section in FIG. 8), such that only air is used as a dielectric 14 between the planar antenna structure formed on the upper PCB 16 and the lower PCB 18 ground plane. In an alternative embodiment (not shown), rather than upper PCB 16 being separated from lower PCB 18 by a wrap-around flex PCB ring 12, upper PCB 16 may be separated from lower PCB 18 by spacers or "tabs", which may be formed of PCT or other materials or structures, spaced periodically about the periphery of, and between, upper PCB 16 and lower PCB 18. In the embodiment of FIGS. 7 and 8, lower PCB 18 is also comprised of FR4. The antenna system further comprises an output MCX connector 21 for connecting the antenna system to a GNSS or other receiver.

Referring to FIGS. 7 and 8, a signal is received in loop 1, and continues into the four cross-dipole arms 4 via the coupling capacitors 2. The signal then travels down the four cross-dipole arms 4 through matching capacitors (1.8 pF) 3, with two of each of the opposing cross-dipole arms 4 feeding two balanced-to-unbalanced transformers (also known as a BALUN) 6. The BALUN combines the two opposing arms with a 0 and 180 degree phase shift effectively. This results in the signals of the four cross-dipole arms 4 being combined into two signal paths which have 0 and 90 degree differences. The embodiment of FIGS. 7 and 8 further includes a vertical feed network PCB 7 that includes a hybrid 90-degree splitter that combines the RF paths from the BALUNs 6 on the top of PCB 16 with minimal losses. The hybrid effectively shifts one signal path with a 0-degree delay and the other with 90-degree delay before combining them together into one output path. So the output from the BALUN which was at 0 degrees is passed through the path on the hybrid which adds 90 degree shift, whereas the signal from the BALUN which had 90 degree shift relative to the other signal passes through the arm of the hybrid which adds no additional phase shift. So when the two signals are combined they are in phase and increase the total signal on the one output (provided the received signal was RHCP). If the received signal was LHCP the two paths would be completely opposed (0 and 180 degrees apart) and would cancel when combined at the output of the hybrid. When assembled as in 50 the one path from the hybrid is fed into the LNA. The result is that the four arms are combined though 0, 90, 180 and 270 degrees of delay with minimal loss, before being passed into the LNA. The correct phasing causes the received energy on each arm to be delayed properly before being combined to maximize the total energy for a Right-Hand circular polarized signal.

The embodiment of FIGS. 7-8 is also shown including ground plane enhancement tabs 10 formed on upper PCB 16 and configured to improve backlobe rejection and polarization (reduce the left-hand circular polarization (LHCP)) in spite of a relatively small ground plane of lower PCB 18. In the embodiment of FIGS. 7 and 8, lower PCB 18 and upper PCB 16 have a diameter of approximately 107 mm. In this embodiment, PCB ring 12 is approximately 1 cm tall, and is soldered between the lower PCB 18 and the upper PCB 16. In this embodiment, there are 8 ground enhancement tabs 10, each with two arms, which further enhance the ground plane and help to absorb back lobes. In alternative embodiments, other ground plane enhancements may also be used, such as, for example, fractal ground plane enhancements. The embodiment generally illustrated in FIGS. 7 and 8 provides low elevation gain and increases radiation resistance relative to a cross-dipole antenna.

Figure 9:
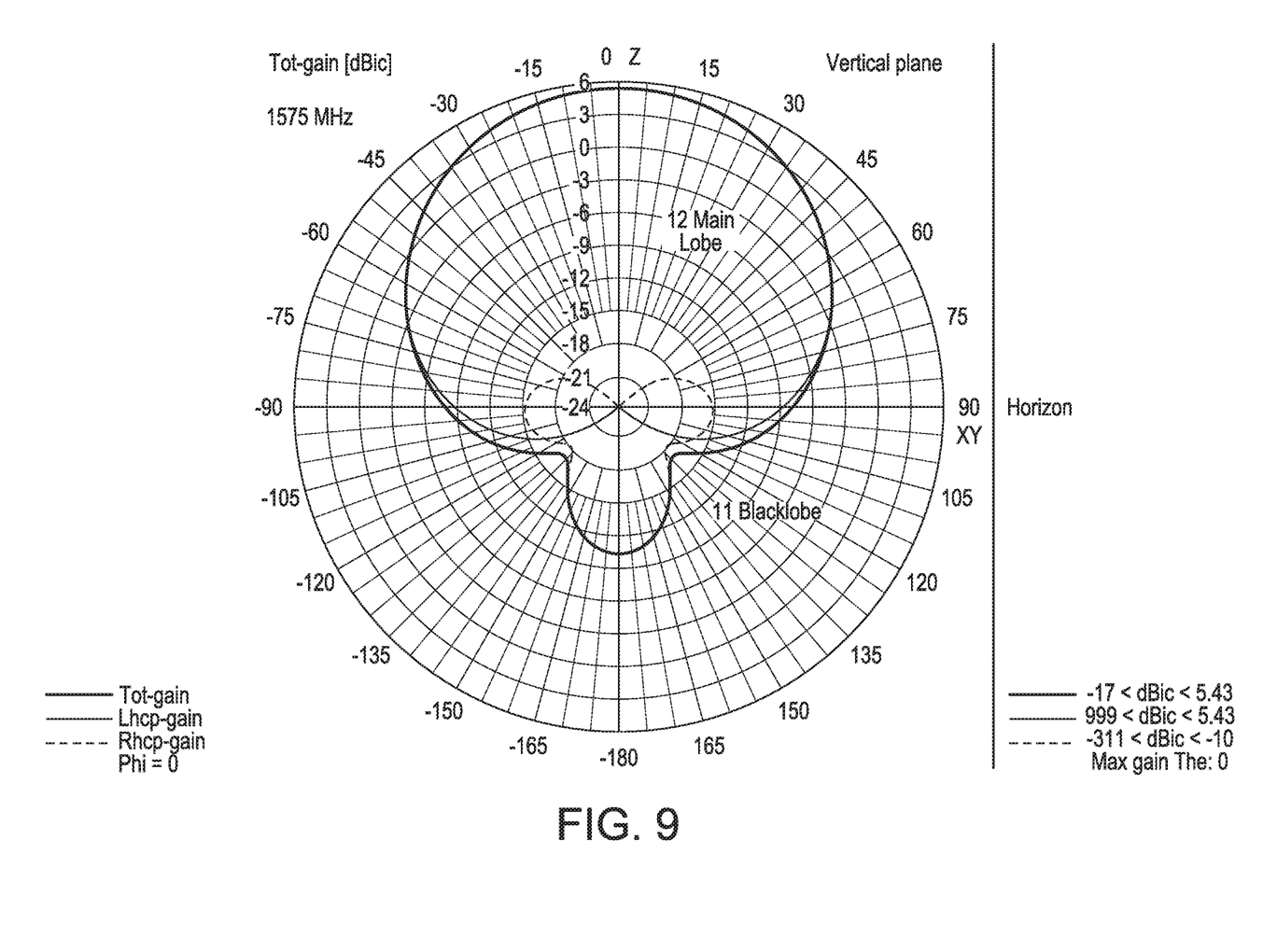
FIG. 9 is a diagrammatic view of a simulated gain pattern of a GNSS antenna system in accordance with an embodiment; and, FIG. 10 is a diagrammatic view of a simulated gain pattern of a GNSS antenna system with no ground enhancements.
Figure 10:
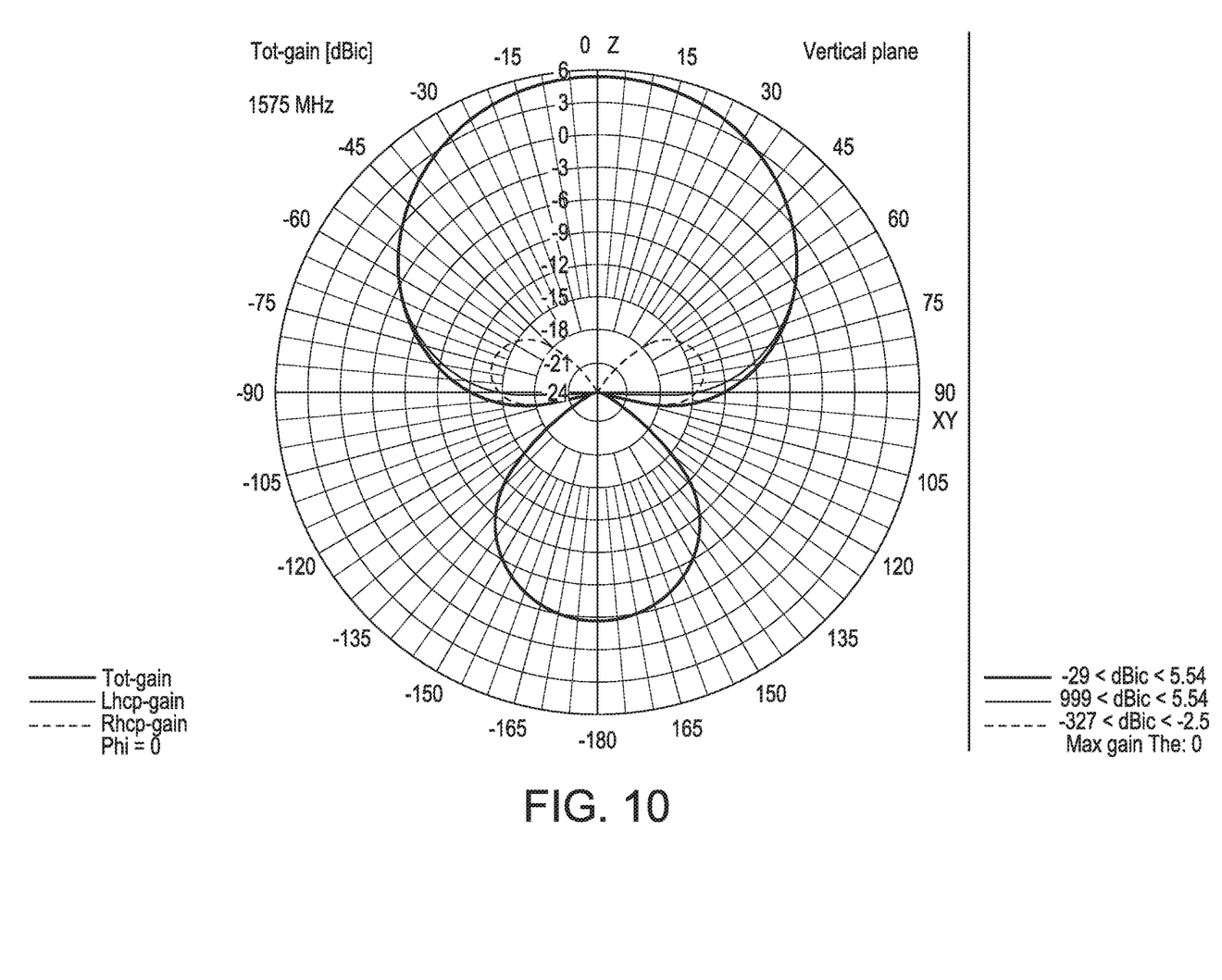

FIGS. 9 and 10 generally illustrate simulations performed by Applicant. Referring to FIG. 9, the simulations indicated that for an embodiment of FIGS. 7 and 8, the impedance of the antenna system 50 was approximately 57 Ohms. FIG. 10 generally illustrates, for comparison purposes simulation results of an embodiment of FIGS. 7 and 8 without ground enhancement tabs 10 present. As can be seen, removing the ground enhancement tabs 10 results in an undesired significant increase in the size of the backlobe. In addition, simulations were performed for comparison purposes for antenna systems lacking the loop 1. The simulation results (not shown) demonstrated that removing the loop 1 from the antenna system resulted in a significant, undesired decrease in the impedance (the impedance was only approximately 4 Ohms as compared with approximately 57 Ohms for the embodiment of FIGS. 7 and 8. This demonstrates the advantage of including the coupled loop 1, which increases the radiation resistance of the antenna. It should be appreciated that a higher radiation resistance makes it easier to impedance match, provides a wider bandwidth, and permits higher operating efficiency for the overall antenna.

It should be appreciated that by providing for an air dielectric 14 as opposed to a different dielectric such as, for example, ceramic or plastic, lower losses (higher efficiency) and lower cost can be achieved while providing higher performance. Another advantage of using air as the dielectric is that it increases the useful bandwidth of the antenna system.

It should also be appreciated that by tuning the capacitors 2 coupled to the loop 1, the gain pattern of antenna system 50 may be adjusted and/or optimized. It should further be appreciated that the embodiments disclosed provide for improved antenna performance while providing for an antenna system that is of a minimal height (in the case of the embodiment of FIGS. 7 and 8, only approximately 1 cm tall). It should also be appreciated that in embodiments, the baluns employed can provide 2:1, 4:1 or 1:1 impedance matches, or for other impedance matches.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. The GNSS antenna system comprising:
a loop antenna provided on a first planar substrate and having a circumference; and, a cross-dipole antenna having four arms provided on the first planar substrate and located completely within the circumference of the loop antenna and coupled to the loop antenna wherein the loop antenna has a circumference of a first wavelength, and wherein each arm of the cross-dipole antenna has a length of ¼ of the first wavelength.

2. The GNSS antenna system of claim 1 wherein the distance between adjacent cross-dipole arms is the same about a center point of the loop antenna.

3. The GNSS antenna system of claim 1 wherein each of the cross-dipole arms is of an identical spiral shape.

4. The GNSS antenna system of claim 1 further comprising a second ground plane planar substrate positioned parallel to, and below, the first planar substrate, wherein the cross-dipole antenna is coupled to the second ground plane planar substrate.

5. The GNSS antenna system of claim 4, wherein the first planar substrate and second ground plane planar substrate have the same shape and are positioned such that they substantially overlap each other.

6. The GNSS antenna system of claim 4 further comprising:
a plurality of ground extensions provided on the first planar substrate about the loop antenna and coupled to the second ground plane planar substrate, the plurality of ground extensions being configured to enhance low elevation performance and absorb back lobe energy.

7. The GNSS antenna system of claim 4 further comprising a dielectric material positioned between the first planar substrate and second ground plane planar substrate.

8. The GNSS antenna system of claim 1, further comprising a second loop antenna provided on the first planar substrate, the second loop antenna having a circumference different than the first loop antenna and providing an additional resonance such that the GNSS antenna system is configured to support multiple GNSS frequency bands.

9. The GNSS antenna system of claim 4, wherein the distance between the first planar substrate and second ground plane planar substrate does not exceed 1 cm in height.

10. A method for providing an optimized GNSS antenna comprising the steps of:
providing a first loop antenna having a first wavelength on a first planar substrate;
providing a cross-dipole antenna having four symmetrical arms on the first planar substrate and completely within the circumference of the first loop antenna and spaced symmetrically about the center of the substrate, each arm having a length equal to ¼ the first wavelength;
coupling a first end of each arm to the first loop antenna; and,
coupling a second end of each arm to a GNSS receiver.

11. The method of claim 10, further comprising the steps of:
providing a ground plane planar substrate positioned parallel to, and below, the first planar substrate, wherein the cross-dipole antenna is coupled to the second ground plane planar substrate.

12. The method of claim 11, further comprising the steps of:
providing an air gap between the ground plane planar substrate and the first planar substrate.

13. The method of claim 12, wherein the cross-dipole is coupled to the second ground plane planar substrate through a balun.

14. The method of claim 12, further comprising the step of providing a plurality of ground extensions on the first planar substrate about the first loop antenna and coupled to the ground plane planar substrate, the plurality of ground extensions being configured to enhance low elevation performance and absorb back lobe energy.

* * * * *